UNITED STATES PATENT OFFICE.

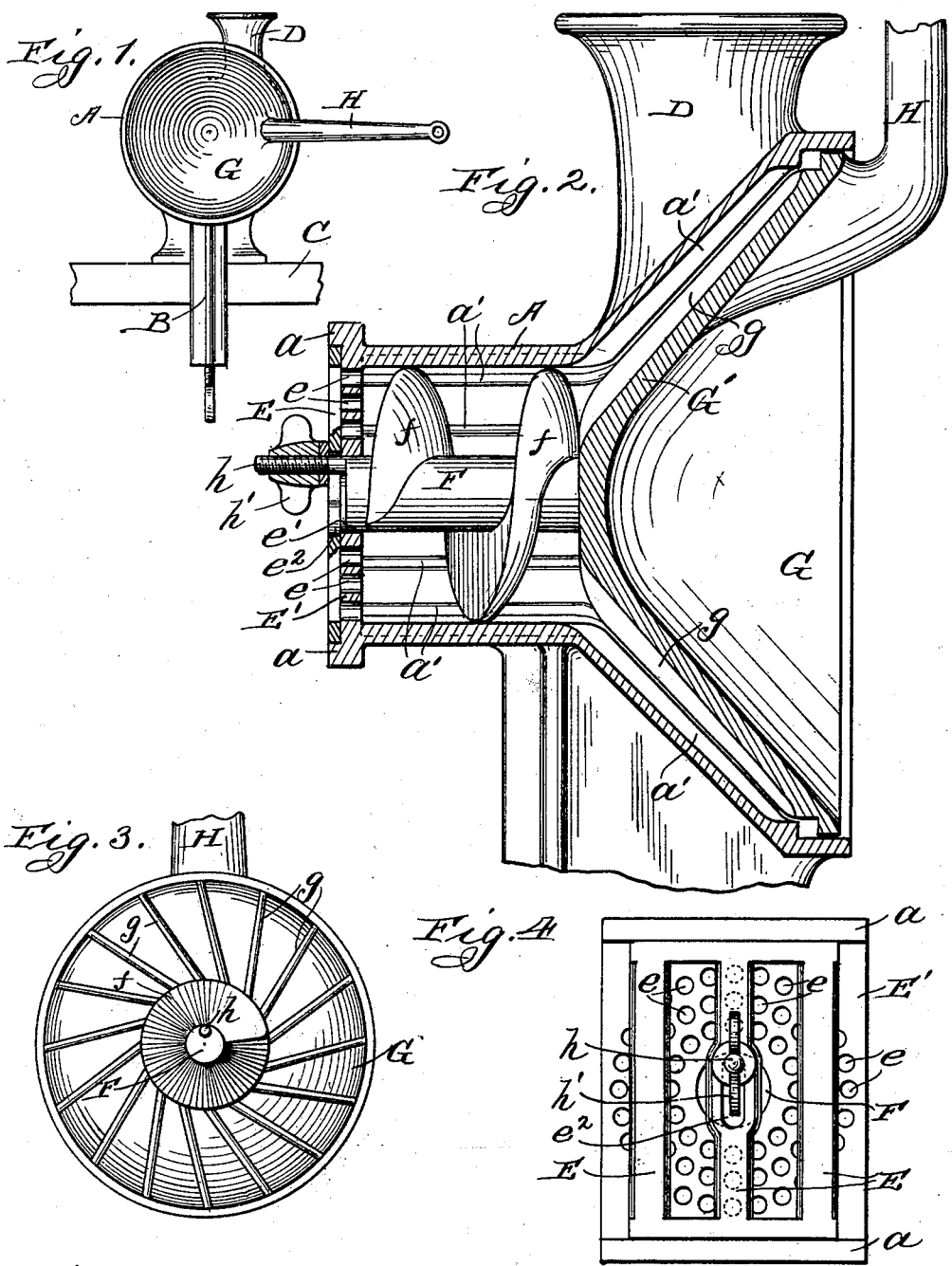

MATTHEW BURTON, OF BATAVIA, ILLINOIS.

MEAT-CUTTER.

SPECIFICATION forming part of Letters Patent No. 679,884, dated August 6, 1901.

Application filed August 25, 1900. Serial No. 27,980. (No model.)

*To all whom it may concern:*

Be it known that I, MATTHEW BURTON, a citizen of the United States, residing at Batavia, in the county of Kane and State of Illinois, have invented certain new and useful Improvements in Meat-Cutters, of which the following is a specification.

This invention relates to improvements in that class of meat-cutters in which an outer casing with a hopper to receive the meat and a screw or worm is employed for forcing it through the casing; and it consists in certain peculiarities of the construction, novel arrangement, and operation of the various parts thereof, as will be hereinafter more fully set forth and specifically claimed.

In using meat-cutters of the above-named type, which are now and heretofore have been in general use, great difficulty is experienced in feeding meat to the machine, for by the turning of the screw or worm the casing is soon filled, and the meat must necessarily be packed therein in order to attain the crushing and comminuting effect or operation desired. When thus filled, the machine refuses to take in any more, unless it is forced in with great pressure, and this is usually done by means of one hand of the operator, with great risk and danger of having the fingers crushed or injured.

It is therefore the principal object of my invention to provide a meat-cutter of such form and construction that it will of itself, when the screw or forcer is being turned, draw the meat or feed into the casing through the mouth or hopper without the necessity of manual or other external pressure and will cut it into small pieces.

Another object is to furnish a meat-cutter of simple and inexpensive construction which will crush the meat while it is passing through the casing and will also cut it as it is being discharged therefrom.

In order to enable others skilled in the art to which my invention pertains to make and use the same, I will now proceed to describe it, referring to the accompanying drawings, in which—

Figure 1 is a view in front elevation of a meat-cutter embodying my invention. Fig. 2 is an enlarged vertical sectional view, partly in elevation, showing the crank-handle and lower portion of the cutter broken away for convenience of illustration. Fig. 3 is a rear end view of the forcer detached from the casing; and Fig. 4 is a view in elevation of the rear end of the casing, showing the reciprocating knives thereon.

Similar letters refer to like parts throughout the different views of the drawings.

A represents the casing, which may be made of any suitable material and is provided on its lower portion with a clamp B of the ordinary or any preferred construction, to be used for securing the cutter to a table C or other suitable support. The front part of the casing is flaring or funnel-shaped and is provided in its upper portion with a hopper D, which is preferably located to one side of a vertical line drawn through the center of the casing, as is clearly shown in Fig. 1 of the drawings. The rear portion of the casing A is cylindrical and is provided at its end with parallel flanges $a$, which serve as guides for the knives or blades E, which are usually three in number and have each of their sides sharpened. The rear end of the casing A is closed by means of a plate E', which in the present instance is shown as being integral with the casing, but which may be otherwise secured thereto. This plate is provided with a series of perforations $e$, through which the meat is forced by a screw or forcer, and is also provided with a central opening $e'$, in which the shaft F of the forcer G has its bearings. The interior of the casing A is provided with a series of ribs $a'$, which extend from about the front or open end of the casing to the rear end thereof and form a corrugated surface of the interior of the casing. These ribs may extend longitudinally with the casing, or they may extend longitudinally with the cylindrical part of the casing and tangentially with the flaring portion thereof.

Located within the casing A is the forcer G, which comprises a convex portion G' and a shaft F, having a screw blade or worm $f$, located in the cylindrical part of the casing. The surface of the portion G' of the forcer adjacent to the inner surface of the flaring part of the casing is provided with a series of ribs $g$, which are preferably arranged tangentially thereon, as shown in Fig. 3 of the drawings, and form said surface of the forcer into a corrugated or ribbed surface. The forcer G is formed or provided with a handle H near its periphery, to be used for turning the same, and the rear end of the shaft F is provided with a screw-threaded crank-pin $h$, on which is located a nut $h'$, employed for holding the forcer in position within the casing. The crank-pin $h$ projects through a slot $e^2$ in one of the knives or blades E, which knives or blades are united together, as shown in Fig. 4 of the drawings, and which construction causes them to be reciprocated when the forcer is turned, which operation will cause the meat to be cut into fine portions, as is apparent.

By employing a cutter of the above-described construction it is evident that when the meat is placed in the hopper the pieces will be caught between the ribs of the forcer and those of the casing and as the forcer revolves will be forced toward the worm or screw blade, by means of which it will be carried to the rear of the casing and pressed through the perforations $e$ and as it is discharged therefrom will be cut by knives E as they move back and forth.

Having thus fully described my invention, what I claim as new, and desire to secure by Letters Patent, is—

The combination with a casing having its front portion flaring and provided with a hopper communicating with said flaring part, and also having on its interior a series of ribs, and at its rear end small openings, of a forcer journaled in the casing and having a convex and ribbed portion located in the flaring part of the casing and a worm or screw in the rear part thereof, blades or knives movably located on the rear end of the casing, one of said knives having a slot or elongated opening, and a pin eccentrically located on the end of the shaft of the forcer and extending into the said slot, substantially as described.

MATTHEW BURTON.

Witnesses:
CHAS. C. TILLMAN,
H. A. THOMAS.